March 28, 1944.  F. H. ERPS  2,345,106
AUTOMOTIVE VEHICLE GLARE SHIELD
Filed Oct. 16, 1942  2 Sheets-Sheet 1
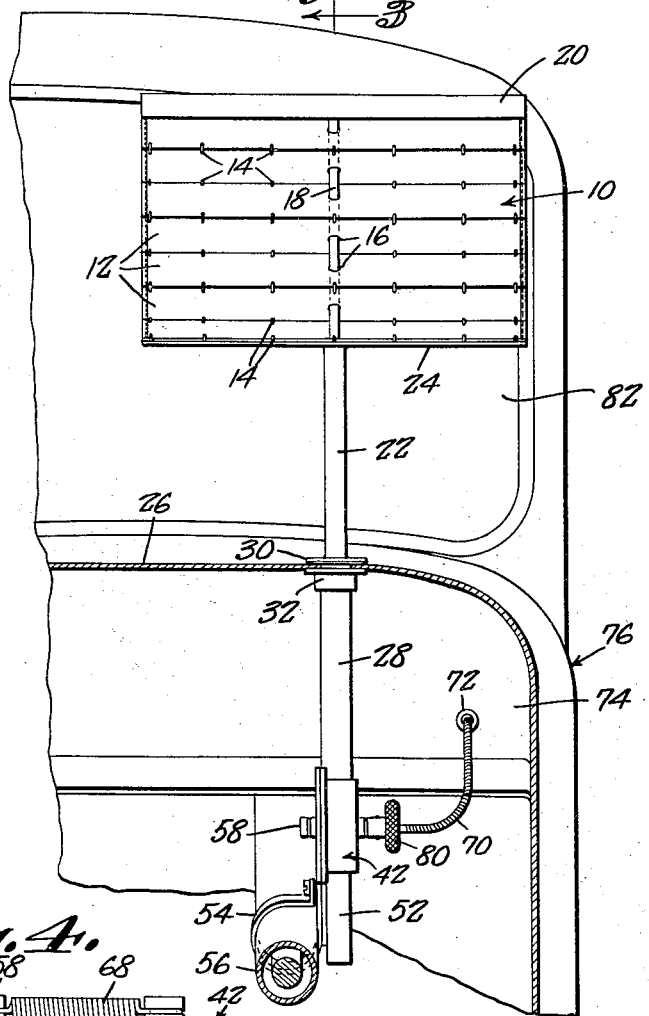
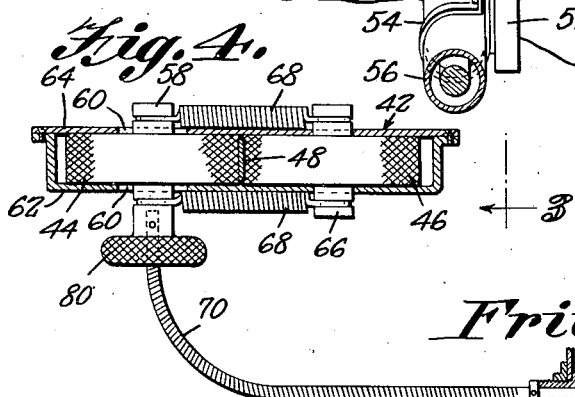
Fritz H. Erps,
INVENTOR.

March 28, 1944.  F. H. ERPS  2,345,106
AUTOMOTIVE VEHICLE GLARE SHIELD
Filed Oct. 16, 1942  2 Sheets-Sheet 2
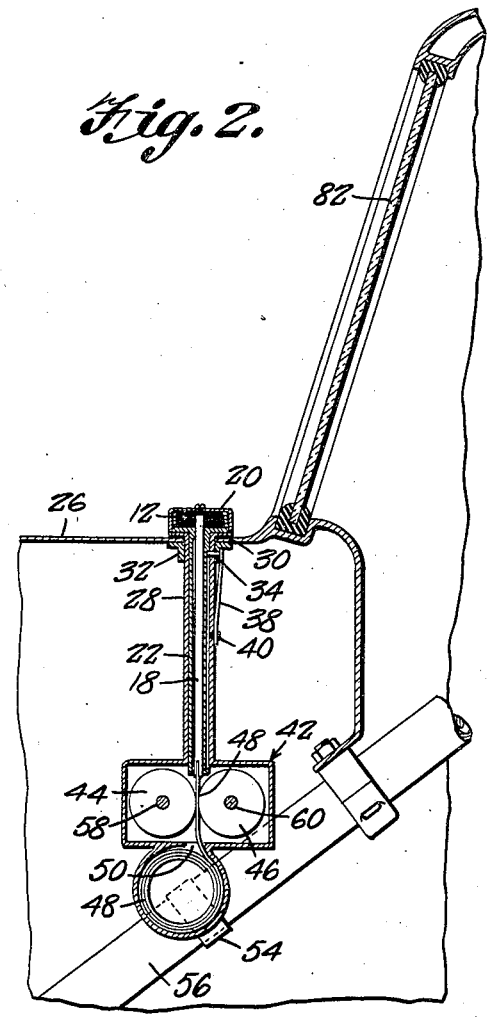
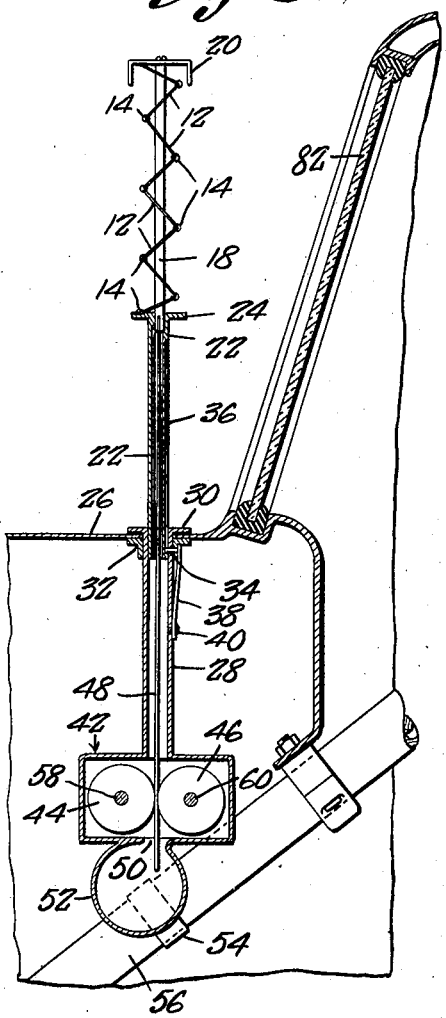
Fritz H. Erps,
INVENTOR.
BY
Victor J. Evans & Co.
ATTORNEYS Patented Mar. 28, 1944

2,345,106

UNITED STATES PATENT OFFICE 2,345,106

AUTOMOTIVE VEHICLE GLARE SHIELD

Fritz H. Erps, Silver Cliff, Colo.

Application October 16, 1942, Serial No. 462,303

6 Claims. (Cl. 296—97)

My invention relates to automotive vehicles, and has among its objects and advantages the provision of an improved glare shield.

In the accompanying drawings:

Figure 1 is an elevational view of a portion of a wind shield of an automobile illustrating my glare shield associated therewith with a portion of the vehicle in section to illustrate the manner in which the glare shield is mounted on the steering column and slidably guided through the cowl structure;

Figure 2 is a sectional view of the glare shield in its collapsed or normal condition;

Figure 3 is a sectional view taken along the line 3—3 of Figure 1; and

Figure 4 is a sectional detail view of a portion of the glare shield structure.

In the embodiment selected for illustration, I make use of a glare shield 10 comprising horizontal strips 12 of suitably colored transparent material. These strips are pivotally connected one with the other in edge to edge relationship through the medium of rings 14, so that the strips may be folded into face to face relationship for the purpose of compactness, as illustrated in Figure 2. Each strip is provided with an opening 16 intermediate its ends for slidably receiving a guide and supporting rod 18 having a channel-like hood 20 secured to its upper end to provide an enclosure for the strips 12 in their collapsed arrangement of Figure 2.

The rod 18 is slidably guided in a tube 22 having a plate 24 at its upper end to which the lowermost strip 12 is pivotally connected. This plate constitutes a bed for the strips 12 in their collapsed condition, with the hood 20 embracing the perimeter of the plate, as in Figure 2.

Depending from the cowl 26 of the vehicle is an outer tube 28 secured thereto by a flange 30 at the outer end of the tube and a collar 32 mounted on the tube underneath the cowl 26. The tube 22 slides inside the tube 28 and the rod 18 is slidably guided by the tube 22. Rotation of the tube 22 relatively to the tube 28 is restrained by reason of a pin 34 extending through an opening in the tube 28 and slidable in a longitudinal slot 36 in the tube 22. Pin 34 is preferably mounted on a flat spring 38 secured at 40 to the tube 28.

At the lower end of the tube 28 is provided a housing 42 inside which are mounted rollers 44 and 46 having pressure engagement with a steel strap 48 connected at its upper end with the rod 18. Figures 2 and 3 illustrate the housing 42 as being provided with an opening 50 placing the housing in communication with a circular housing 52 inside which the strap 48 is coiled when the tube 36 and the rod 18 are lowered to the positions of Figure 2.

In Figure 1, the housing 52 is provided with a clip 54 for clamping the housing to the steering column 56.

Figure 4 illustrates the roller 44 as being provided with a shaft 58 extending through slots 60 in the wall 62 and the cover plate 64 of the housing 42. A shaft 66 is rotatably journaled in the wall 62 and the cover plate 64 for supporting the roller 46. Tension springs 68 are connected with the shafts 58 and 66 to hold the rollers 44 and 46 in frictional engagement with the strap 48, so that the strap may be raised and lowered through rotation of the roller 44 through the medium of a flexible shaft 70.

One end of the shaft 70 is fixedly connected with the shaft 58 and the other end of the shaft is rotatably supported in a bearing 72 attached to the wall 74 of the vehicle 76. To the end of the shaft 70 adjacent the wall 74 is connected a handwheel 78, a similar handwheel 80 being connected with the shaft 58.

In operation, the glare shield unit 10 lies in a collapsed condition so as to be enclosed in a relatively small housing 20. The unit may be extended to the position of Figure 1 through turning of the handwheel 78. Both rollers 44 and 46 have knurled peripheral faces engaging the strap 48 so that the latter is effectively pinched between the rollers. Thus rotation of the roller 44 will impart longitudinal movement to the strap 48 for raising and lowering the tube 36 and the rods 18, depending upon direction of rotation of the handwheel 78. The pin 34 limits the telescopic range of the tube 22 inside and outside the tube 28. In lowering the unit, the housing 52 causes the strap 28 to coil upon itself so that the strap may be enclosed in a relatively small housing.

The shield unit 10, when extended in accordance with Figure 3, lies in a vertical plane slightly in advance of the windshield 82. The handwheel 80 provides means for rotating the roller 44 in case of impairment of the flexible shaft 70.

In the extended position of the glare shield unit 10, the strips 12 are arranged in zigzag formation and have binding engagement with the rod 18 so as to be restrained from movement beyond the extended positions illustrated. Thus the rod 18 is prevented from being pushed entirely outside the tube 22.

Without further elaboration, the foregoing will so fully illustrate my invention, that others may, by applying current knowledge, readily adapt the same for use under various conditions of service.

I claim:

1. In an automotive vehicle, the combination of a support, a first vertical tube secured to said support, a second tube slidable in said first tube, a rod slidable in said second tube, a foldable glare shield secured to the upper end of said rod and to the upper end of the second tube, a flexible member attached to said rod and movable through said first and second tubes to shift the second tube and the rod to extended positions with respect to the first tube and with respect to each other to unfold the shield and to fold the shield upon nesting the second tube and the rod inside the first tube, a circular housing for coiling said flexible member upon retraction of said rod and second tube, and rotary means engaging said flexible member to impart movement thereto.

2. In an automotive vehicle, the combination of a support, a first vertical tube secured to said support, a second tube slidable in said first tube and having a cross member, a rod slidable in said second tube provided with a cross member, a foldable glare shield secured to the upper end of said rod and to the upper end of the second tube, said shield having strips of transparent material pivotally connected in edgewise relationship one with the other with the two outermost strips respectively pivotally connected with said cross members, a flexible member attached to said rod and movable through said first and second tubes to shift the second tube and the rod to extended positions with respect to the first tube and with respect to each other to unfold the shield and to fold the shield upon nesting the second tube and the rod inside the first tube, and rotary means engaging said flexible member to impart movement thereto.

3. In an automotive vehicle, the combination of a support, a first vertical tube secured to said support, a second tube slidable in said first tube and having a cross member, a rod slidable in said second tube provided with a cross member, a foldable glare shield secured to the upper end of said rod and to the upper end of the second tube, said shield having strips of transparent material pivotally connected in edgewise relationship one with the other with the two outermost strips respectively pivotally connected with said cross members, said second mentioned cross member being in the nature of a channel shaped to enclose said strips in their folded relationship upon said first mentioned cross member, a flexible member attached to said rod and movable through said first and second tubes to shift the second tube and the rod to extended positions with respect to the first tube and with respect to each other to unfold the shield and to fold the shield upon nesting the second tube and the rod inside the first tube, and rotary means engaging said flexible member to impart movement thereto.

4. In an automotive vehicle the combination of a support, the first vertical tube secured to said support, a second tube slidable in said first tube, a rod slidable in said second tube, a foldable glare shield having a plurality of transparent strips pivotally connected in edgewise relationship one with the other, a cross member on said second tube having pivotal connection with one outermost strip, a cross member attached to said rod having pivotal connection with the other outermost strip, said strips being provided with openings slidably receiving said rod and arranged in zigzag alignment in the unfolded condition of the shield but lying in face to face relationship upon retraction of said second tube and said rod, a flexible member attached to said rod and movable through said first and second tubes to shift the second tube and the rod to extended positions with respect to the first tube and with respect to each other to unfold the shield and to fold the shield upon nesting the second tube and the rod inside the first tube, and rotary means engaging said flexible member to impart movement thereto.

5. In an automotive vehicle, the combination of a support, a first vertical tube secured to said support, a second tube slidable in said first tube, a rod slidable in said second tube, a foldable glare shield secured to the upper end of said rod and to the upper end of the second tube, a flexible member attached to said rod and movable through said first and second tubes to shift the second tube and the rod to extended positions with respect to the first tube and with respect to each other to unfold the shield and to fold the shield upon nesting the second tube and the rod inside the first tube, rotary means engaging said flexible member to impart movement thereto, said rotary means comprising rollers engaging opposite sides of said flexible member, spring means for yieldingly pressing the rollers against the flexible member, and a flexible and manually actuated shaft fixedly secured to one of said rollers to impart rotation thereto.

6. In an automotive vehicle, the combination of a support, a first vertical tube secured to said support, a second tube slidable in said first tube, a rod slidable in said second tube, a foldable glare shield secured to the upper end of said rod and to the upper end of the second tube, said shield being located to extend across the windshield of the vehicle in the unfolded position of the shield, a flexible member attached to said rod and movable through said first and second tubes to shift the second tube and the rod to extended positions with respect to the first tube and with respect to each other to unfold the shield and to fold the shield upon nesting the second tube and the rod inside the first tube, rotary means mounted on the steering column of the vehicle engaging said flexible member to impart movement thereto, and a flexible shaft connected with said rotary means and accessible for manual actuation from the driver's position inside the vehicle.

FRITZ H. ERPS.